(12) United States Patent
Haldeman et al.

(10) Patent No.: US 10,940,944 B2
(45) Date of Patent: Mar. 9, 2021

(54) TRANSMISSION MOUNT

(71) Applicant: Bell Helicopter Textron Inc., Fort Worth, TX (US)

(72) Inventors: Andrew Paul Haldeman, Fort Worth, TX (US); Zachary Edwin Dailey, Grapevine, TX (US); Charles Owen Black, Flower Mound, TX (US); Dalton T. Hampton, Fort Worth, TX (US); Aaron Alexander Acee, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 294 days.

(21) Appl. No.: 15/967,220

(22) Filed: Apr. 30, 2018

(65) Prior Publication Data
US 2019/0329878 A1    Oct. 31, 2019

(51) Int. Cl.
*B64C 27/52*    (2006.01)
*B64C 27/12*    (2006.01)

(52) U.S. Cl.
CPC .............. *B64C 27/52* (2013.01); *B64C 27/12* (2013.01)

(58) Field of Classification Search
CPC ................................. B64C 27/12; B64C 27/52
See application file for complete search history.

(56) References Cited

U.S. PATENT DOCUMENTS

| | | | |
|---|---|---|---|
| 7,137,591 B2 * | 11/2006 | Carter | B64C 27/52 244/17.27 |
| 2013/0214087 A1 * | 8/2013 | Corrigan | B64C 27/10 244/17.13 |

FOREIGN PATENT DOCUMENTS

WO    WO-2014088443 A1 *    6/2014    ............. B64C 27/10

\* cited by examiner

*Primary Examiner* — Richard G Davis
(74) *Attorney, Agent, or Firm* — Lightfoot & Alford PLLC

(57) ABSTRACT

A transmission tilt control device includes a transmission rotatably coupled to an airframe of a helicopter, a rotor mast coupled to the transmission, and an actuator coupled between the transmission and the airframe. The actuator being configured to rotate the transmission fore and aft about a tilt axis that is perpendicular to an axis of rotation of the rotor mast.

17 Claims, 5 Drawing Sheets

TRANSMISSION MOUNT

BACKGROUND

Rotor blade flapping is a major limiting factor in helicopter design. The greater the velocity of the helicopter, the larger the degree of blade flapping that is required to counter the dissymmetry of lift created by the different relative velocities between the advancing and retreating blades. In addition, the maximum degree of blade flapping determines the forward and aft limits of the center of gravity ("CG") envelope of the helicopter. Accordingly, in order to increase the top speed and increase the possible cargo configurations, it is desirable to allow a large degree of blade flapping. However, large blade flapping angles reduce the life of many rotor components, such as, composite flapping flexures, elastomeric bearings, and lined spherical bearings. In addition, the rotor mast, bearings, and top case are sized to react the moments generated by blade flapping. Therefore, the larger the degree of blade flapping allowed, the larger/heavier the components required to react the generated moments.

In order to reduce the degree of blade flapping at cruising speed and to maintain a level fuselage pitch attitude to minimize drag, helicopters typically have about five degrees of static forward tilt in the main rotor mast. The main rotor mast tilt angle also determines the center of the CG envelope. It is imperative that a helicopter CG fall within the boundaries of the CG envelope. Because the boundary of the CG envelope is fixed, ballast is often added to the nose, tail boom, or cabin to bring the helicopter CG within the boundary of the CG envelope. Adding ballasts has several deleterious effects: it reduces useful payload, requires additional support structure in the nose and tail boom to bear the additional weight, and ballasts cannot be repositioned during flight.

DETAILED DESCRIPTION

Figure 1:
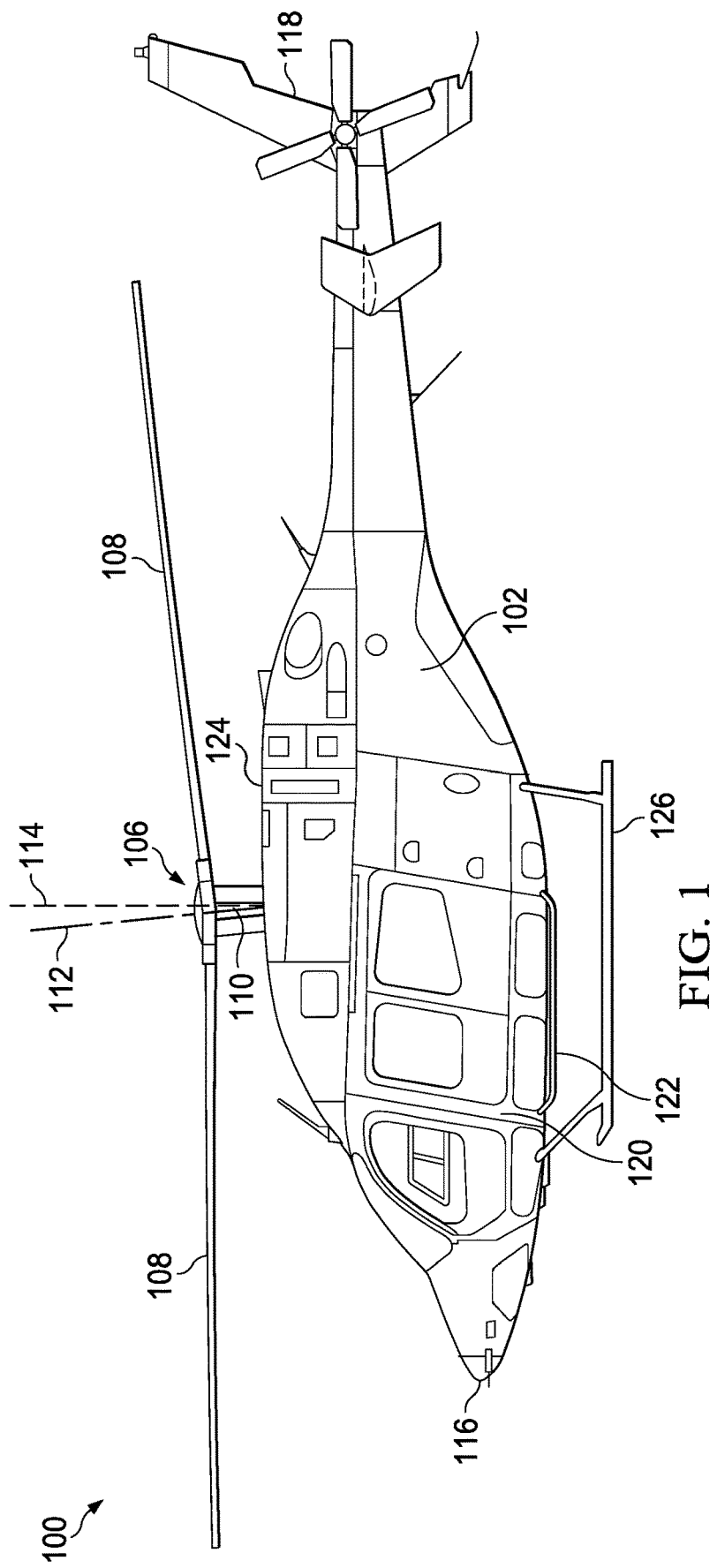
FIG. 1 is a side view of an aircraft according to this disclosure.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a transmission tilt control device configured to modify the forward/aft tilt of a transmission, a rotor mast, and a rotor system coupled thereto. By allowing the tilt of the rotor mast to be changed, the transmission tilt control device can further reduce the amount of rotor blade flapping experienced by the helicopter, while maintaining or increasing the rotor tip path plane angle. Reduced blade flapping means the magnitude of moments to react, and rotor system component deflections are decreased, and therefore, the components designed to react those moments and deflections may be made smaller and/or lighter. It also, means longer life spans for the rotor components subject to wear during blade flapping.

Moreover, enabling the forward/aft tilt angle of the transmission and rotor mast to vary by only two or three degrees forward or aft may expand the CG envelope by up to thirty percent compared to a transmission and rotor mast with a fixed tilt angle. By providing an adjustable transmission tilt angle, the fore/aft CG envelope can be expanded without increasing the required fore/aft rotor blade flapping angles. Therefore, a wider range of hub types may be used for applications previously unavailable because of inherent flapping limitations. This adjustable tilt angle may also allow indiscriminate cargo loading within the cabin, expanded fuel system configurations, multiple cargo hook attachment locations, expanded sloped landing ranges, real-time/in-flight CG envelope adjustments, and eliminate the need for ballast. While this disclosure describes the transmission tilt control device, the same principles could be applied to a transmission roll control device to provide lateral tilt of the transmission and rotor mast. Lateral tilting of the transmission would be specifically advantageous in helicopters equipped with hoists. The lateral CG could be expanded up to 50% by employing similar for/aft tilt angles. This could allow for increased hoist loads.

Referring now to FIG. 1, a side view of a helicopter 100 according to this disclosure is shown. Helicopter 100 comprises a fuselage 102, including a structural airframe 104 (shown in FIGS. 2 and 3) and a main rotor assembly 106, including rotor blades 108 and a rotor mast 110. Rotor blades 108 rotate about an axis of rotation 112 of rotor mast 110. Rotor mast 110 has a neutral position wherein axis of rotation 112 is angled approximately five degrees forward of a vertical line 114 when the helicopter 100 is at rest. Fuselage 102 includes a front end 116, a rear end 118, a port side 120, a starboard side (not shown), a bottom 122, and a top 124. Helicopter 100 further includes landing gear 126 extending from bottom 122 of fuselage 102. Landing gear 126 may be equipped with weight sensors (not shown) connected to the onboard computer to assist in determining the location of the CG before taking flight. Helicopter 100 may also include pitch attitude sensors (not shown) and rotor flapping sensors (not shown) connected to the onboard computer to assist in determining an optimal tilt angle 127 of rotor mast 110 during flight. For example, if the load of helicopter 100 changes while in flight, such as by, dropping supplies, passengers exiting, expending munitions, burning fuel, hoisting, etc., causing the CG to migrate outside the CG envelope or to a less desirable location within the CG envelope, the sensors will transmit indicia of increased flapping and an undesirable pitch attitude and tilt angle 127 of a transmission 128 and rotor mast 110 may be modified to reposition the CG envelope, thereby reducing the flapping angle and restoring a favorable pitch attitude. These adjustments may be fully automated or may be input by a pilot or crew member.

Figure 2:
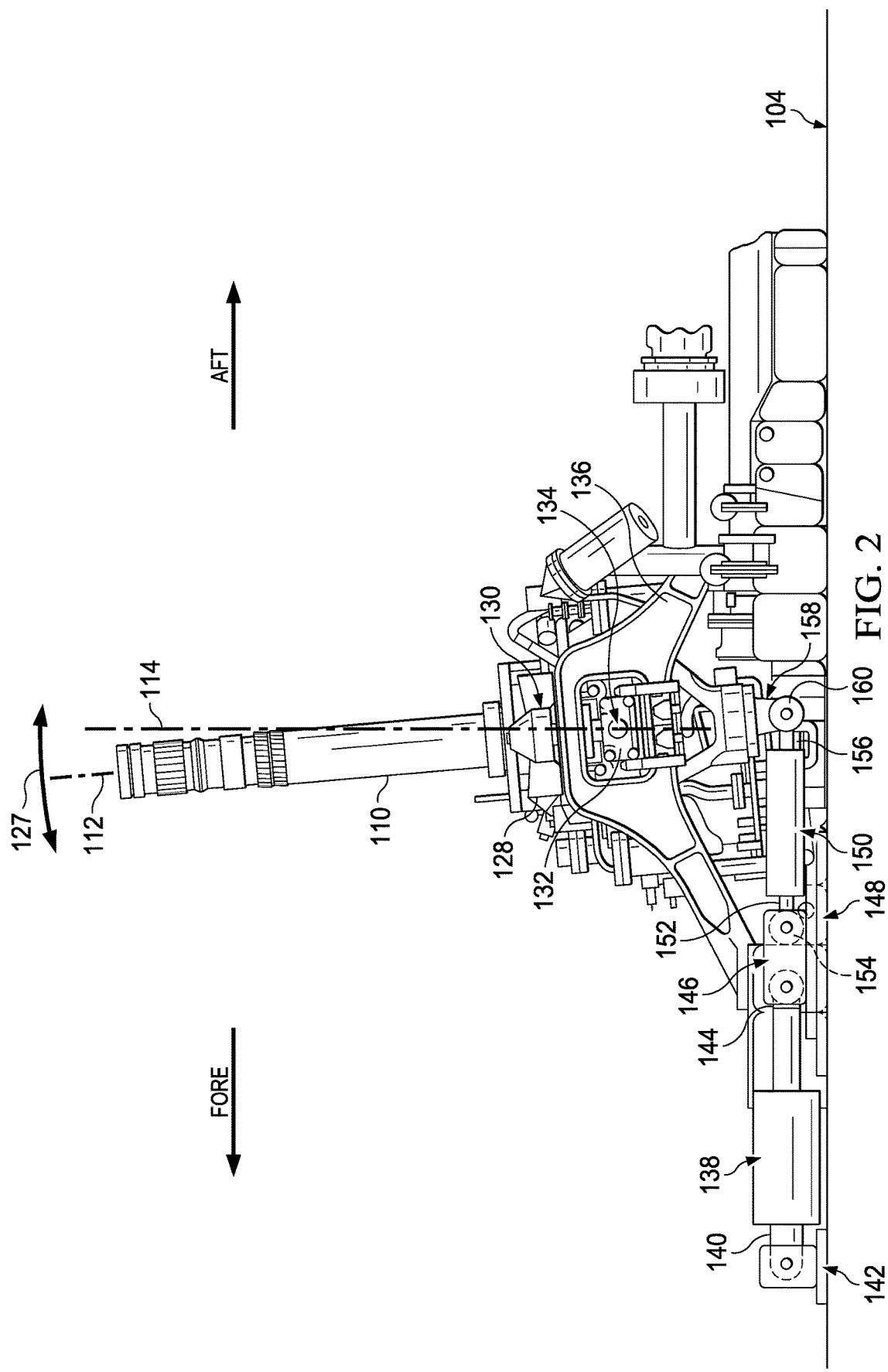
FIG. 2 is a side view of a transmission tilt control device according to this disclosure.
Figure 3:
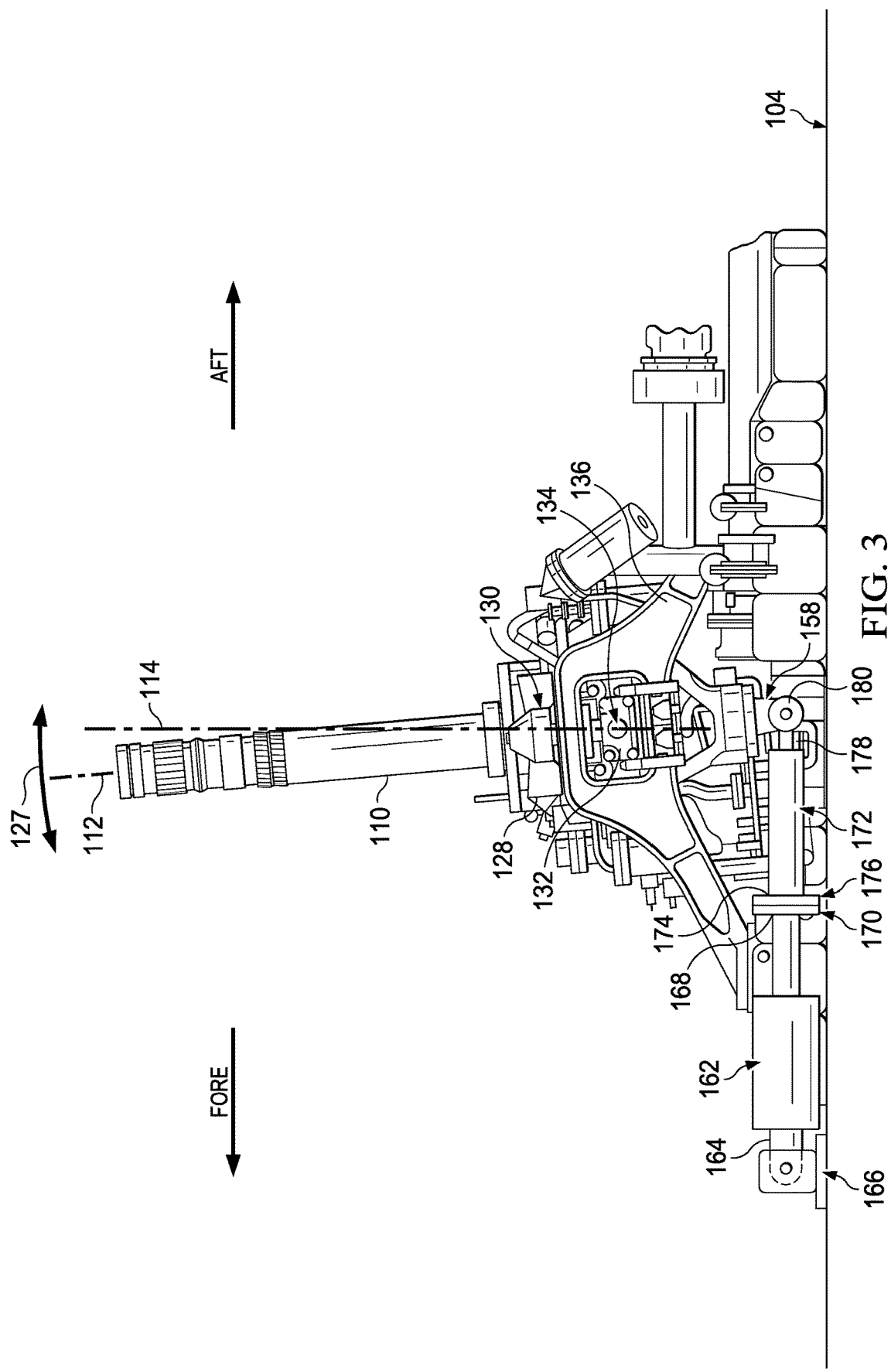
FIG. 3 is a side view of another transmission tilt control device according to this disclosure.

Within fuselage 102 is a cabin for carrying passengers and cargo. Above the cabin, an engine (not shown) and transmission 128 are coupled to airframe 104 within fuselage 102. As shown in FIGS. 2 and 3, transmission 128 is connected to two liquid inertia vibration elimination ("LIVE") units 130 (only LIVE unit 130 on port side 120 is shown) that connect to airframe 104 of helicopter 100. LIVE units 130 are provided for isolating fuselage 102 from mechanical vibrations, such as harmonic vibrations, which are associated with the propulsion system and which can arise from the engine, transmission 128, and rotor assembly 106. A bridge beam 132, rigidly coupled to transmission 128, captures and connects to a spherical center bearing (not shown) of each LIVE unit 130. The spherical center bearings allow bridge beam 132, and therefore transmission 128 and rotor mast 110, to rotate about a tilt axis 134 (perpendicular to the page in FIGS. 1-3) that passes through the foci of the spherical center bearings. Tilt axis 134 is perpendicular to, and may intersect, axis of rotation 112. The interface between bridge beam 132 and the spherical center bearings may allow for a maximum rotation of transmission 128 and rotor mast 110 of anywhere between one and five degrees fore and aft of the neutral position. That is, the total maximum range of rotation of transmission 128 and rotor mast 110 about tilt axis 134 is ten degrees or less. Each LIVE unit 130 is connected to airframe 104 via a truss 136.

Referring now to FIG. 2, tilt angle 127 of transmission 128 and rotor mast 110 is affected by an actuator 138. Actuator 138 includes a first end 140 coupled to airframe 104 by a clevis or spherical joint 142 and a second end 144 coupled to a sliding yoke 146. Sliding yoke 146 is slidably coupled to a sliding rail 148 that is rigidly coupled to airframe 104 so that sliding yoke 146 may slide forward and aft in response to actuation of actuator 138. However, sliding rail 148 prevents sliding yoke 146 from vertical or lateral movement. A pitch restraint 150 is provided to attenuate some vibration of transmission 128 about tilt axis 134 and includes a first end 152 rotatably coupled to sliding yoke 146 via a clevis or spherical joint 154 and a second end 156 rotatably coupled to a lug 158 that extends from a bottom of transmission 128 via a clevis or ball joint 160. Pitch restraint 150 may be made of an elastomeric material, or any other material suitable for absorbing vibratory energy. Because lug 158 is affixed to transmission 128, which rotates about tilt axis 134 and translates with LIVE units 130, lug 158 will experience some vertical movement relative to airframe 104 during use. Accordingly, pitch restraint 150 must be capable of rotating relative to sliding yoke 146 and lug 158. Actuator 138 and pitch restraint 150 may be positioned port or starboard of transmission 128, or they may be positioned centrally relative to airframe 104. To provide redundancy, there may be more than one actuator 138 and pitch restraint 150. Accordingly, one actuator 138 and pitch restraint 150 may be positioned on each side of transmission 128, two actuators 138 and pitch restraints 150 may both be centrally located, or any combination thereof.

Referring now to FIG. 3, tilt angle 127 of transmission 128 and rotor mast 110 is affected by an actuator 162. Actuator 162 includes a first end 164 rotatably coupled to airframe 104 via a clevis or spherical joint 166 and a second end 168 having a flange 170. A pitch restraint 172 is provided to attenuate some vibration of transmission 128 about tilt axis 134 and includes a first end 174 having a flange 176 coupled to flange 170 of actuator 162 and a second end 178 rotatably coupled to lug 158 via a clevis or spherical joint 180. Pitch restraint 172 may be made of an elastomeric material, or any other material suitable for absorbing vibratory energy. Because lug 158 is affixed to transmission 128, which rotates about tilt axis 134 and translates with LIVE units 130, lug 158 will experience some vertical movement relative to airframe 104 during use. Accordingly, both actuator 162 and pitch restraint 172 must be capable of rotating relative to airframe 104 and lug 158. Actuator 162 and pitch restraint 172 may be positioned port or starboard of transmission 128, or they may be positioned centrally relative to airframe 104. To provide redundancy, there may be more than one actuator 162 and pitch restraint 172. Accordingly, one actuator 162 and pitch restraint 172 may be positioned on each side of transmission 128, two actuators 162 and pitch restraints 172 may both be centrally located, or any combination thereof.

Actuators 138, 162 may be linear actuators, comprising any one of mechanical, hydraulic, pneumatic, and electro-mechanical actuators. Alternatively, actuators 138, 162 may be replaced with a rotary actuator (not shown). For example, the rotary actuator may comprise an electric motor coupled to airframe 104. The electric motor can have a gear coupled thereto, wherein the gear is configured to engage complementary gear teeth on a bottom surface of transmission 128, such that rotation of the gear by the motor causes rotation of transmission 128.

Figure 4:
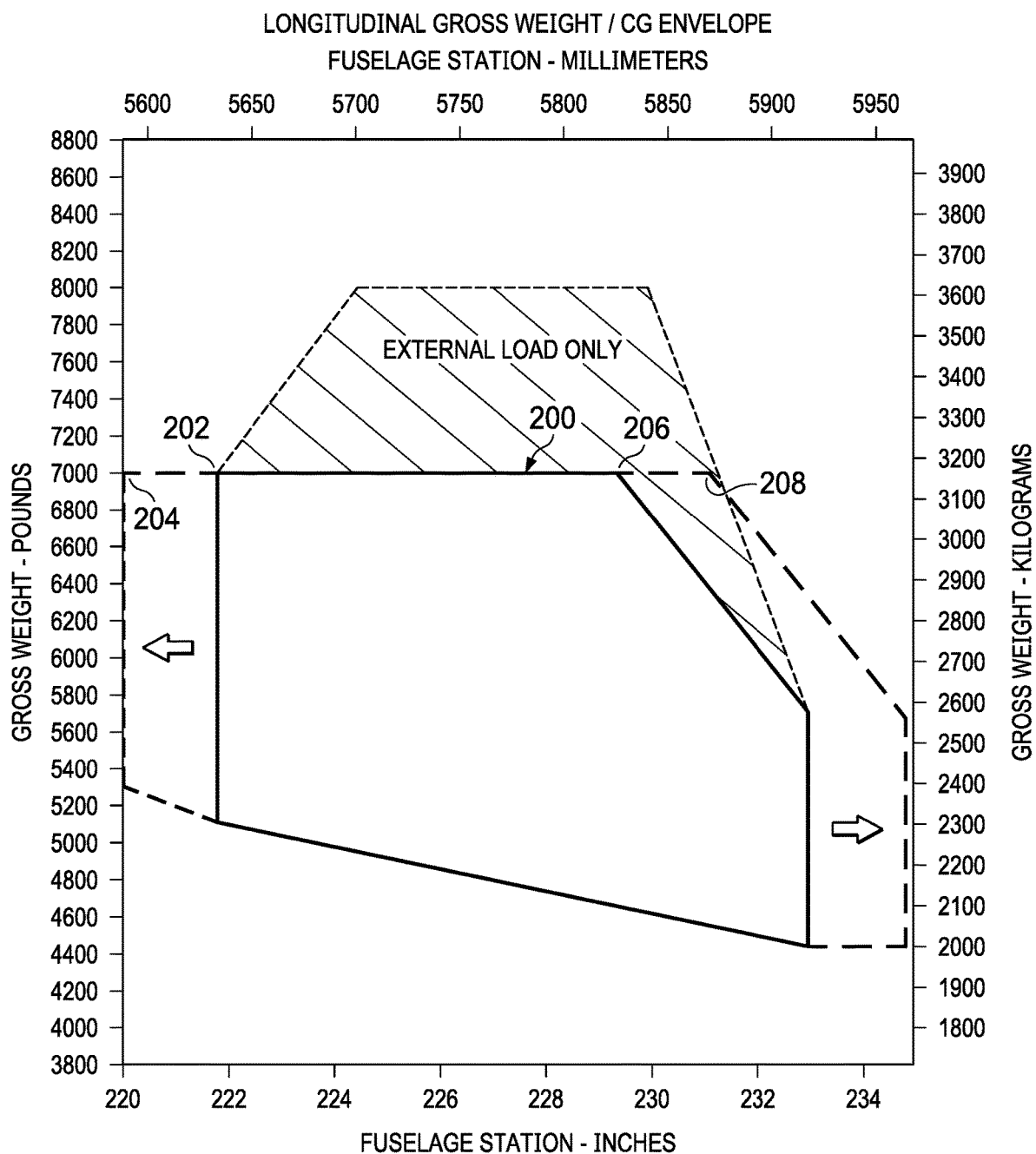
FIG. 4 is a chart showing a CG envelope of a helicopter with and without a transmission tilt control device.

Referring now to FIG. 4, an example fore/aft CG envelope 200 is shown. In CG envelope 200 a forward maximum CG limit 202 of helicopter 100 with transmission 128 and rotor mast 110 at the neutral position is seven thousand pounds gross weight with a CG positioned at two hundred twenty-one and eight tenths inches. Retracting actuator 138, 162, and thereby causing transmission 128 and rotor mast 110 to rotate aft approximately three degrees about tilt axis 134 enables CG envelope 200 to shift forward to a new forward maximum CG limit 204 of seven thousand pounds gross weight with a CG positioned at two hundred twenty inches. Similarly, in CG envelope 200 an aft maximum CG limit 206 of helicopter 100 with transmission 128 and rotor mast 110 at the neutral position is seven thousand pounds gross weight with a CG positioned at two hundred twenty-nine and three tenths inches. Extending actuator 138, 162, and thereby causing transmission 128 and rotor mast 110 to rotate forward approximately three degrees about tilt axis 134 enables CG envelope 200 to shift aft to a new aft maximum CG limit 208 of seven thousand pounds gross weight with a CG positioned at two hundred thirty-one inches. As such, providing several degrees of forward or aft transmission tilt can greatly increase CG envelope 200.

Figure 5:
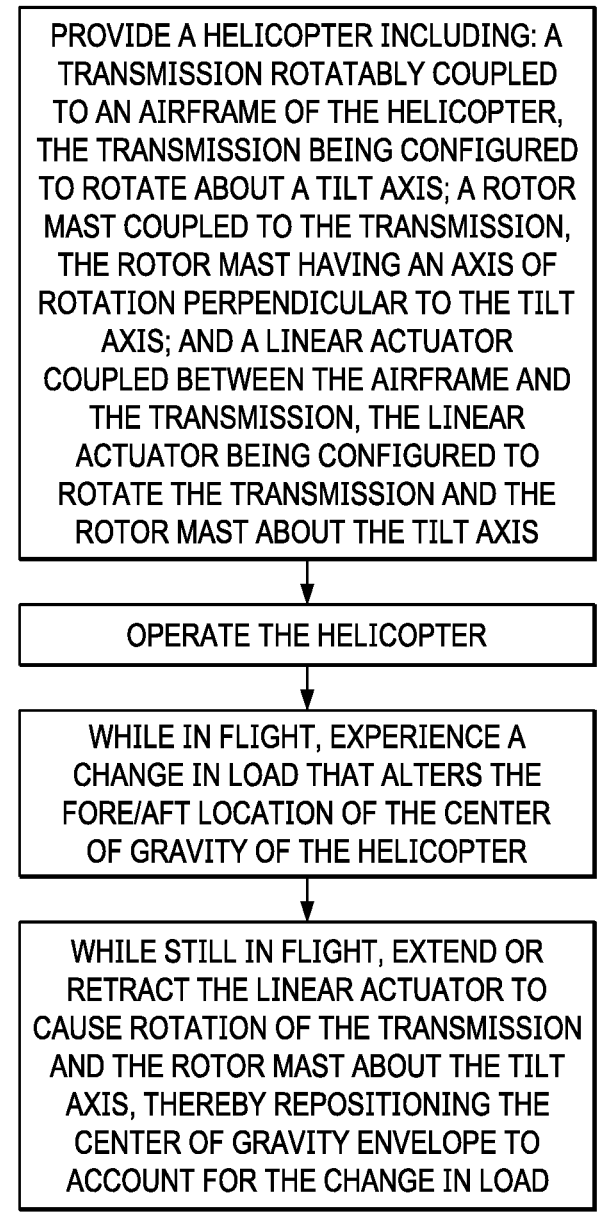
FIG. 5 is a block diagram of a method of modifying a CG envelope of a helicopter while in flight.

Referring not to FIG. 5, a block diagram of a method of modifying CG envelope 200 of helicopter 100, while in flight, is shown. First, provide helicopter 100 including: transmission 128 rotatably coupled to airframe 104 of helicopter 100, transmission 128 being configured to rotate about tilt axis 134; rotor mast 110 coupled to transmission 128, rotor mast having axis of rotation 112 perpendicular to tilt axis 134; and linear actuator 138, 162 coupled between airframe 104 and transmission 128, linear actuator 138, 162 being configured to rotate transmission 128 and rotor mast 110 about tilt axis 134. Second, operate helicopter 100. Third, while in flight, experience a change in load that alters the fore/aft location of the CG of helicopter 100. Finally, while still in flight, extend or retract linear actuator 138, 162 to cause rotation of transmission 128 and rotor mast 110 about tilt axis 134, thereby repositioning the CG envelope to account for the change in load.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An apparatus, comprising:
    a transmission configured to be rotatably coupled to an airframe of a helicopter, the transmission being configured to rotate about a tilt axis;
    a rotor mast coupled to the transmission, the rotor mast having an axis of rotation perpendicular to the tilt axis; and
    an actuator having a first end and a second end, the first end of the actuator being configured to be coupled to the airframe and the second end being coupled to the transmission;
    wherein actuation of the actuator is configured to cause rotation of the transmission and the rotor mast about the tilt axis; and
    wherein the transmission is rotatably coupled to the airframe through a bearing of a LIVE unit.
2. The apparatus of claim 1, wherein the actuator comprises a linear actuator.
3. The apparatus of claim 2, wherein the linear actuator is coupled to the transmission through a pitch restraint.
4. The apparatus of claim 3, wherein the pitch restraint is elastomeric.
5. The apparatus of claim 4, further comprising:
    a sliding rail coupled to the airframe; and
    a sliding yoke connecting the actuator to the elastomeric pitch restraint, the sliding yoke being slidably coupled to the sliding rail.
6. The apparatus of claim 2, wherein the linear actuator is a ball screw.
7. The apparatus of claim 2, wherein the linear actuator is configured to cause a maximum of ten degrees or less of rotation about the tilt axis.
8. A method of modifying a center of gravity envelope of a helicopter, comprising:
    providing a transmission tilt control device, comprising:
        a transmission rotatably coupled to an airframe of the helicopter about a tilt axis;
        a rotor mast including a bottom coupled to the transmission and a top opposite the bottom, the rotor mast having an axis of rotation perpendicular to the tilt axis; and
        a linear actuator coupled between the airframe and the transmission; and
    extending the linear actuator to cause rotation of the transmission and the rotor mast about the tilt axis so the top of the rotor mast rotates towards a front of the helicopter, thereby shifting the center of gravity envelope towards an aft end of the helicopter;
    wherein the rotation of the transmission is about a bearing of a LIVE unit.
9. The method of claim 8, further comprising:
    retracting the linear actuator to cause rotation of the transmission and the rotor mast about the tilt axis so the top of the rotor mast rotates towards the aft end of the helicopter, thereby shifting the center of gravity envelope towards the front end of the helicopter.
10. The method of claim 9, wherein the extending or retracting of the linear actuator occurs while the helicopter is in flight.
11. A helicopter, comprising:
    an airframe having a port side and a starboard side;
    a transmission rotatably coupled to the airframe about a tilt axis;
    a rotor mast coupled to the transmission, the rotor mast having an axis of rotation that is perpendicular to the tilt axis, the rotor mast being generally centered between the port side and the starboard side of the airframe; and
    an actuator coupled between the airframe and the transmission, the actuator being configured to rotate the transmission and the rotor mast about the tilt axis;
    wherein the transmission is rotatably coupled to the airframe through a bearing of a LIVE unit.
12. The helicopter of claim 11, wherein the actuator comprises a linear actuator.
13. The helicopter of claim 12, wherein the linear actuator is coupled to the transmission through a pitch restraint.
14. The helicopter of claim 13, wherein the pitch restraint is elastomeric.
15. The helicopter of claim 14, further comprising:
    a sliding rail coupled to the airframe; and
    a sliding yoke connecting the linear actuator to the elastomeric pitch restraint, the sliding yoke being slidably coupled to the sliding rail.
16. The helicopter of claim 15, wherein the linear actuator is configured to cause a maximum of ten degrees or less of rotation about the tilt axis.
17. The helicopter of claim 12, wherein the linear actuator is a ball screw.

* * * * *